United States Patent [19]

Scudder et al.

[11] 4,176,511
[45] Dec. 4, 1979

[54] CONVEYOR SYSTEM FOR A HARVESTER

[75] Inventors: Roy Scudder, Marden; Alan Bowes, Ulcombe, both of England

[73] Assignee: FMC Corporation, San Jose, Calif.

[21] Appl. No.: 813,400

[22] Filed: Jul. 6, 1977

[30] Foreign Application Priority Data

Jul. 6, 1976 [GB] United Kingdom ............. 28098/76
Sep. 2, 1976 [GB] United Kingdom ............. 36436/76

[51] Int. Cl.$^2$ .......................................... A01D 46/00
[52] U.S. Cl. ..................................... 56/330; 198/628
[58] Field of Search ............... 56/328 R, 329, 330, 56/331, 10.2, DIG. 16; 198/628

[56] References Cited

U.S. PATENT DOCUMENTS

| | | | |
|---|---|---|---|
| 2,639,569 | 5/1953 | Pasturczak | 56/10.2 |
| 3,309,852 | 3/1967 | Allen | 56/208 |
| 3,466,854 | 9/1969 | Ashton et al. | 56/11.1 |
| 3,470,681 | 10/1969 | Saemann | 56/10.2 |
| 3,538,694 | 11/1970 | Holloway | 56/330 |
| 3,589,109 | 6/1971 | Payne | 56/10.2 |
| 3,609,947 | 10/1971 | Herbsthofer | 56/10.2 |
| 3,901,005 | 8/1975 | Rohrbach et al. | 56/330 |
| 3,972,381 | 8/1976 | Gail | 56/10.2 |
| 4,077,488 | 3/1978 | Bennett, Jr. et al. | 56/10.2 |

FOREIGN PATENT DOCUMENTS 501705 4/1976 U.S.S.R. ................................. 56/330

Primary Examiner—Russell R. Kinsey
Assistant Examiner—Paul J. Hirsch
Attorney, Agent, or Firm—F. W. Anderson

[57] ABSTRACT

The invention relates to an endless conveyor which has a plurality of individual conveying elements which are slidably movable to an extended position laterally of the conveying direction during a conveying run of the conveyor. When the conveyor is mounted on a harvester for harvesting the crop of a row of bushes, vines or canes, the individual elements in their extended position extend below crop dislodging means of the harvester and catch the crop and convey it to a collecting station and this avoids waste. In order to prevent the conveyor from fouling obstacles such as a plant or post during harvesting, there is a device for maintaining the linear speed of the conveyor zero relative to the ground.

4 Claims, 19 Drawing Figures

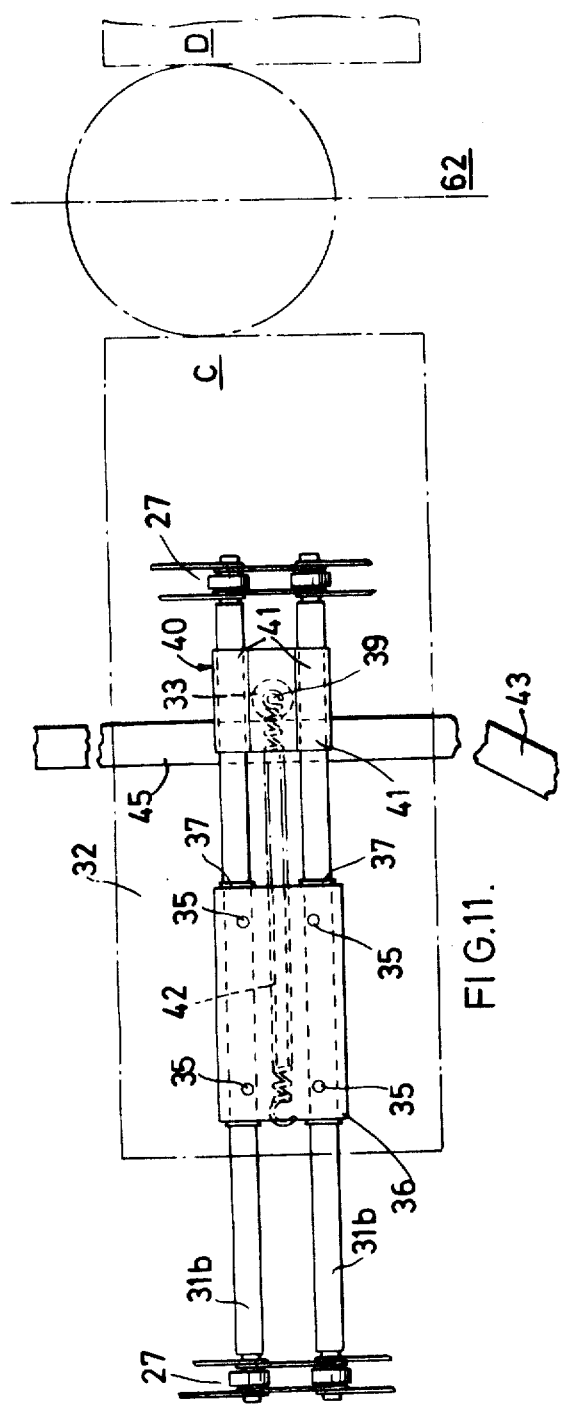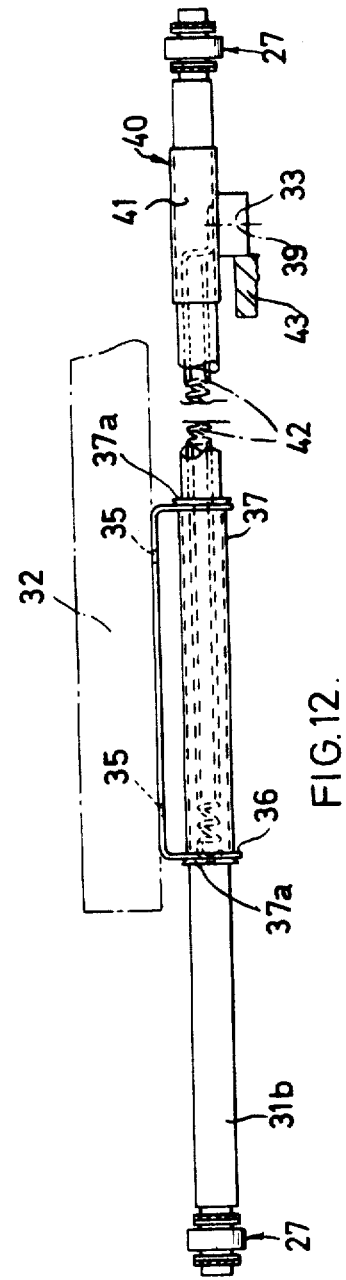
FIG.11.
FIG.12.

CONVEYOR SYSTEM FOR A HARVESTER

The invention relates to conveyors for example conveyors used for collecting harvested tree, bush or vine grown crops such as currants, berries, grapes or any other produce grown on trees, or standing bushes or vines.

Conveyors for receiving and/or conveying objects delivered from above are well known, but it is a drawback with such known conveyors that they often do not catch the majority of the objects being delivered. Thus, when the conveyors are mounted on a machine such as a harvester which moves over the ground, the conveyors, which act as catcher conveyors for harvested fruit, usually do not catch all the harvested fruit which can result in a loss of as much as 50% of the crop. Also, in a field of plants there are obstacles such as the plants themselves, posts and the like which foul the conveyors resulting in damage or a slowing down of the harvesting operation. These considerations effectively require that the conveyors have a zero ground speed. Such a conveyor system is shown in U.S. Pat. No. 3,901,005 to Rohrbach et al. The drive for the catcher conveyors in the aforesaid Rohrbach Patent is synchronised with the drive train to drive wheels of the conveyor and hence will not be effective if the drive wheels slip on the ground over which the harvester moves.

It is accordingly among the objects of the invention to mitigate the aforesaid disadvantages of the prior art.

According to one aspect of the invention there is provoded an endless conveyor comprising a plurality of individual conveyor elements comprising a conveying reach and at least part of each of which is movable or compressible in a direction laterally of the conveying direction of the conveying reach of the conveyor.

According to a second aspect, the invention provides for a harvesting machine, for harvesting tree, bush, cane- or vine-borne crops such as currants, berries or grapes, having a frame which can be moved along a row of standing trees, bushes, canes or vines and which supports a shaker or beater device to release crop from the tree, bushes or vines, an endless conveyor having a conveying reach adapted to be driven in a conveying direction and having a plurality of individual conveying elements at least part of each of which is movable laterally of the conveying direction of the conveying reach of the conveyor, the elements being shaped and disposed to catch crop released by the shaker or beater device.

The individual elements are, in a preferred embodiment used for catching a harvested crop, so arranged over a run in the conveying direction, that they present a substantially continuous surface over that run so that substantially no harvested crop falls to the ground. The substantially continuous surface ensures that liquids are maintained by the conveyor when the conveyor is used to convey berries, grapes or other produce likely to exude juice when they are being harvested.

Each element may suitably comprise a tray- or trough-like element which has a lip along one edge which overlaps an edge of an adjacent tray- or trough-like element of the conveyor.

The elements of the conveyor may be supported by a pair of parallel chains.

According to a third aspect, the invention provides a harvester for harvesting tree-, bush-, cane- or vine-borne crops, comprising a frame which can be moved along a row of standing trees, bushes, canes or vines and which supports a shaker or beater device to release the crop, an endless conveyor as hereinbefore defined extending in the longitudinal direction of the harvesting machine, and means for driving the conveyor so that its conveying direction is opposite to the direction of movement of the harvesting machine over the ground and the linear speed of the conveying reach of the conveyor relative to the ground is zero.

The harvester may be a straddle harvester for harvesting berries or grapes, the harvester including a pair of conveyors as hereinbefore defined of which the elements are adapted to extend into the central passageway through the harvester and to catch and convey harvested berries or grapes.

According to a fourth aspect, the invention provides, for a harvester for harvesting the crop from standing trees, bushes, canes or vines, which harvesting machine has an endless conveyor for catching and conveying harvested crop which conveyor has a zero relative ground speed, a device for maintaining matched speeds between two objects, comprising means adapted and arranged to receive inputs corresponding respectively with the speed of two objects which speeds are to be maintained matched in a desired ratio, one of the input speeds being detected by a ground speed sensor means independent of ground support means of the harvester, and to provide an output which changes with change in the ratio between the input speeds and which is coupled with and actuates a controller for varying the speed of one of the objects so that the desired matched ratio is maintained.

According to a fifth aspect of the invention there is provided a device for maintaining the speeds of two objects in a desired ratio, one of which speeds is related to the ground speed of a vehicle, comprising means for receiving signals related to both of the speeds, one of which is derived from said ground speed by direct ground speed sensing means independent of support and drive means of the vehicle, and for generating an error signal in the event the input signals depart from the desired ratio, and a controller connected to said means to receive the error signal and to effect a correction of one of said speeds and thereby maintain the desired ratio.

The desired ratio may be 1:1, or any other ratio.

The means may be a gear box which has a shaft connectible with one object, a shaft connectible with the second object and a shaft connectible with the controller, the shafts being operatively connected by a gear train to couple the inputs and output and to maintain the desired ratio.

The gear train may comprise a differential gear box.

The controller may be a hydraulic flow control device which includes a valve for controlling hydraulic fluid to a hydraulic motor for driving the first object. Or the controller may be a pneumatic, electrical or mechanical control device which is coupled to a suitable motor for driving the first object.

Constructions embodying the invention are diagrammatically illustrated, by way of example, in the accompanying drawings, in which:

FIG. 11 shows a plan view, with part in phantom, of an element of the second embodiment of conveyor;

FIG. 12 shows an end elevational view, with part in phantom, of an element of the second embodiment of conveyor;

Figure 1:
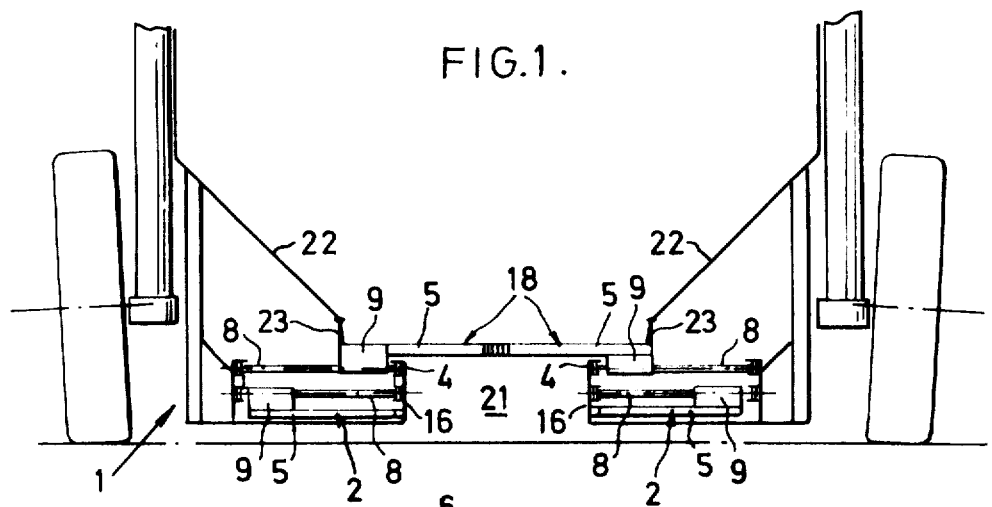
FIG. 1 shows a front elevational view of a harvester for tree, bush or vine grown crops including a conveyor according to the invention.
Figure 2:
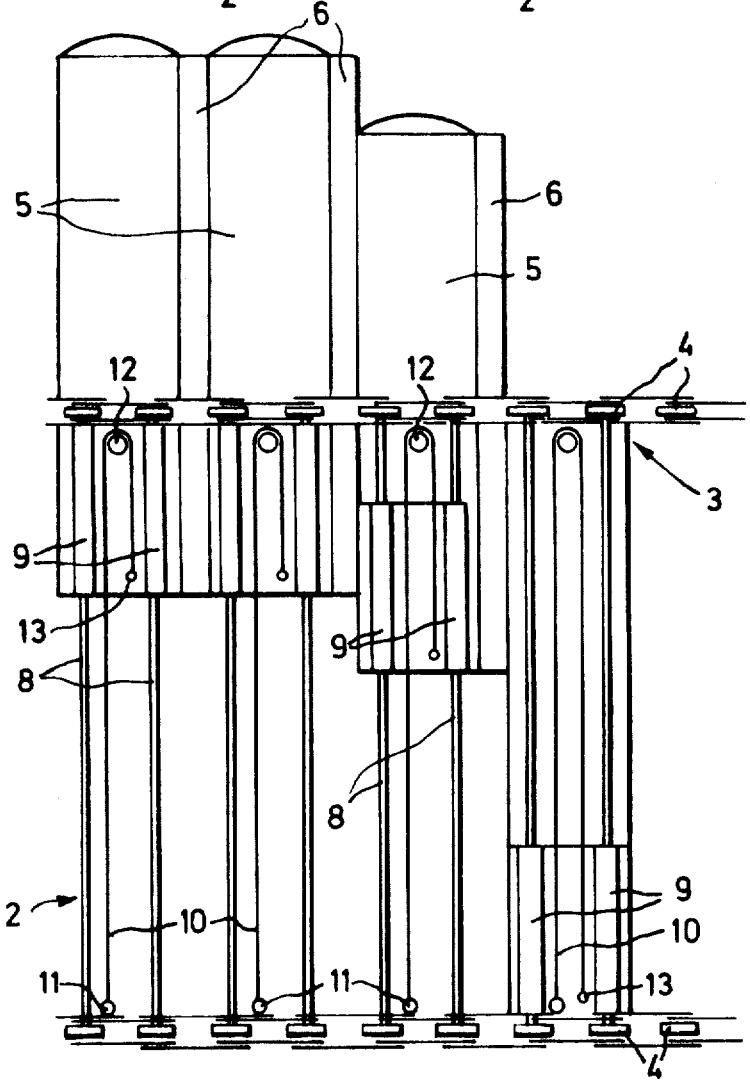
FIG. 2 is an underneath plan view of part of a first conveyor.

Referring firstly to FIGS. 1 to 7 of the drawings, there is shown, on a berry or grape harvester 1, a pair of parallel crop catching and conveying conveyors 2. Each conveyor 2 has a body 3 in the form of a pair of parallel driven chains 4 and a plurality of individual elements 5 each of which is movable in a direction laterally of the direction of movement of a crop catching and conveying reach of the conveyor.

Each element 5 is in the form of a rectangular trough or tray of which the long sides are at right angles to the conveying direction. Each tray 5 has a lip 6 at the free edge of one long side which overlaps a free-edge 7 of the other (unlipped) long side of one adjacent element of the conveyor. In this way, no gaps are formed in the conveyor at least during passage along the conveying reach so that juice is held in the trays 5 with harvested berries or grapes.

The chains 4 of each conveyor carry a plurality of pairs of parallel rods 8. Each pair of rods 8 forms a guide on which a seat part or cam follower, in the form of two tubular sleeves 9 on the under side of each tray 5, can move during the lateral movement of the tray.

Figure 3:
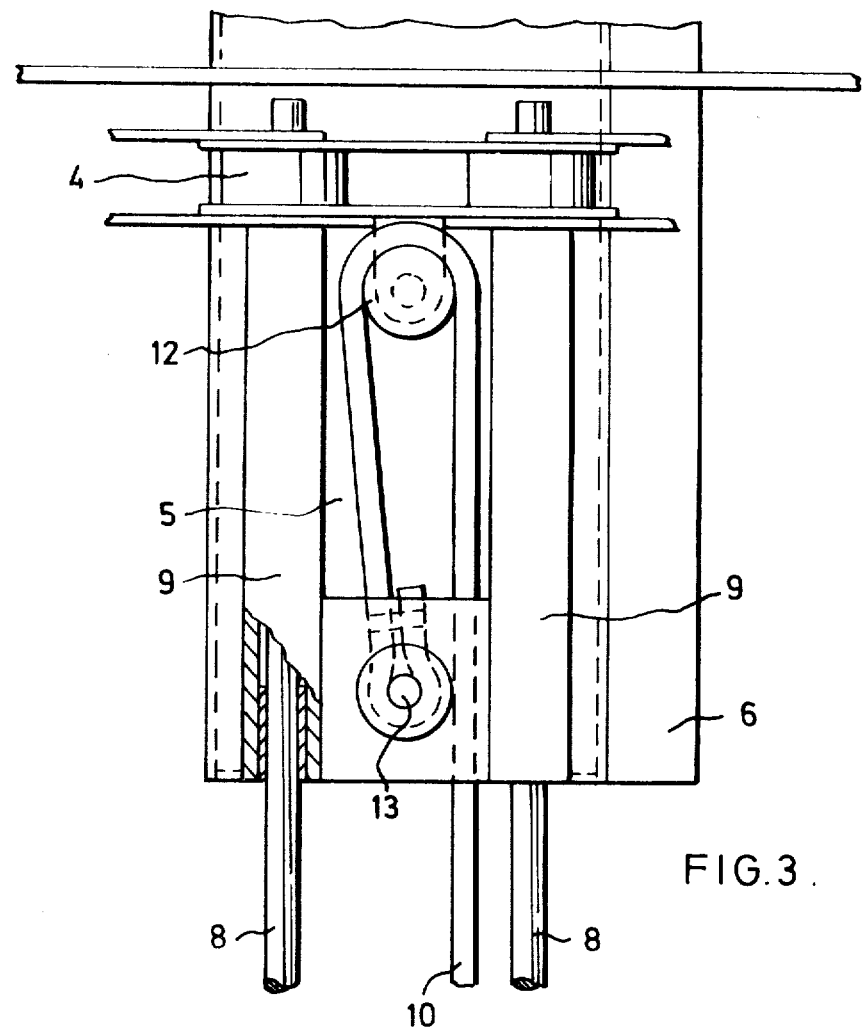
FIG. 3 is a view to an enlarged scale of an element of the conveyor of FIG. 2.
Figure 4:
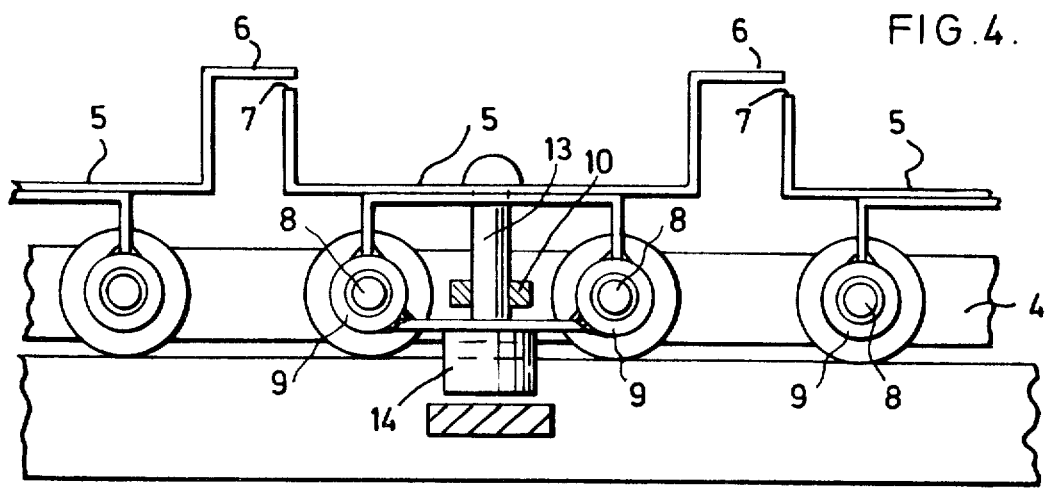
FIG. 4 is a side elevational view of the element of FIG. 3.
Figure 5:
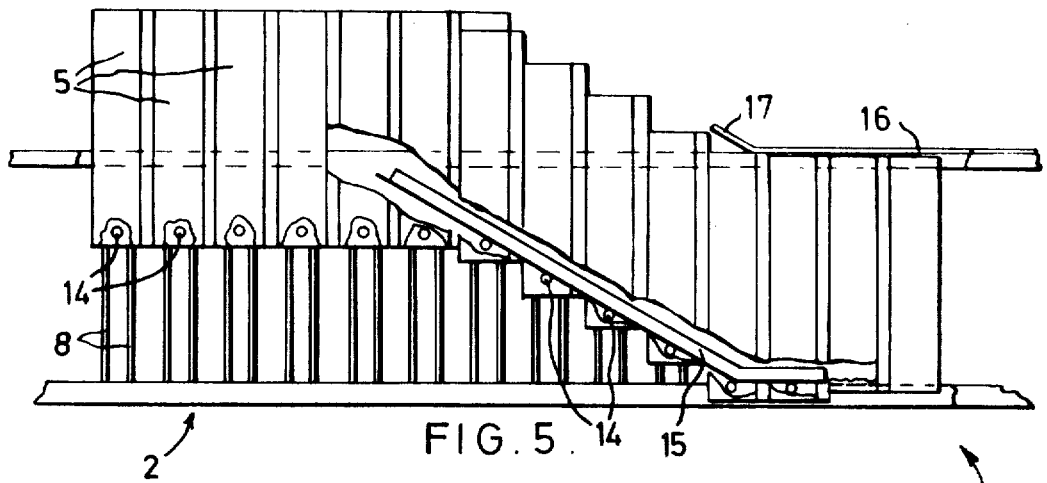
FIG. 5 is a plan view of part of the conveyor of FIGS. 2 to 4 showing retraction of the elements in a conveyor run.
Figure 6:
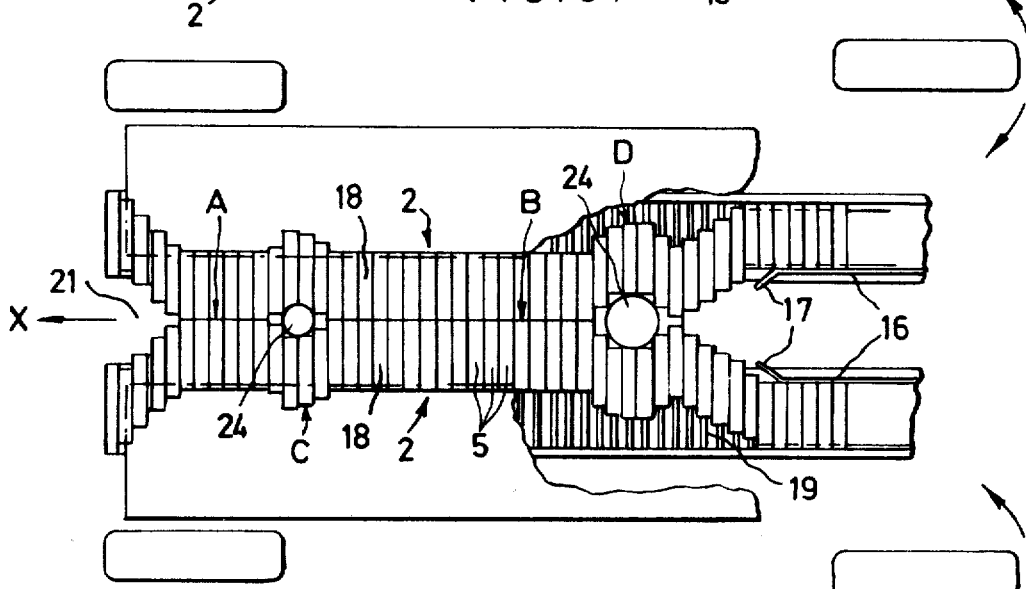
FIG. 6 is a schematic view in plan of the harvester of FIG. 1.
Figure 7:
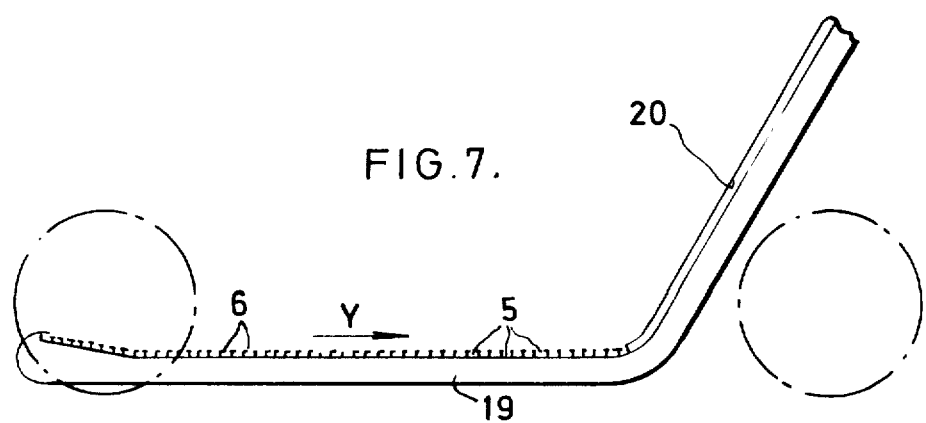
FIG. 7 shows a schematic side elevational view of the conveyor of FIGS. 2 to 6 of the harvester.

The trays 5 are each urged towards the centre line of the harvester by a device in the form of a spring 10 under the tray 5 which extends from an anchorage 11 on a part of the outer chain round a roller 12 on the inner chain to an anchorage 13 on the underside of the tray 5 (see FIG. 3).

The tensions of the springs 10 urge their respective trays 5 to the centre during an upper, crop catching-/conveying, run of the conveyor.

Each tray 5 of the conveyors 2 also has a cam follower in the form of a roller 14 (FIG. 5) at one end. The roller 14 is below the level of the upper reach of the chains 4 and is positioned so that it engages a cam in the form of a striker bar 15 for retracting the trays 5 to positions substantially aligned with and over the chains for the return run. During the return run, the conveyor runs like a conventional one, the spring pressure being absorbed through a guide wall 16 (which has a flared entry 17) via suitable low friction means such as pressure pads or rollers, for example of nylon. A low pressure absorption means such as another wall (not shown) is attached to the outside of the chain.

The conveyors 2 are driven by a hydraulic or mechanical motor of the harvester. During harvesting, the conveyors have a zero velocity with respect to the harvester, that is to say the conveyors are driven with their conveying reaches in a direction opposite to the direction of the harvester but at substantially the same speed.

In operation to harvest grapes for example, the harvester 1 is driven along a row of vines so that it straddles the row. The direction of movement is shown by the arrow 'X' in FIG. 6. The conveying runs of the conveyors 2 move as shown at 'Y' in FIG. 7, in the opposite direction relative to the harvester at the same speed as the harvester. As a result the effective speed of the conveying reach of the conveyors 2 at a vine is zero so that the harvested grapes drop into a seemingly stationary series of trays 5 which are the conveyor elements. This is accomplished by synchronising the speed of the conveyor relative to the speed of the harvester, preferably by a means whereby slippage of the drive ground system of the conveyor or of the wheels does not affect the synchronism. The conveyors 2 each have an upper conveyor run 18, then an upwardly inclined run 20 before a return (lower) run 19 in which the trays are open downwardly. During transition from the upwardly inclined run to the lower run, the grapes are transferred to collecting tubs or other suitable collectors (not shown), as well as described in connection with FIG. 18.

In order to close the centre space 21 of the harvester (normally about 18" in conventional harvesters) the trays 5 are urged to the centre line of the harvester by their springs 10 as they start their upper conveying run. This is progressively accomplished as their rollers 14 travel along an inclined forward striker bar 15 which is angled to an optimum angle, which may be adjusted.

The right hand and left hand conveyor trays meet at approximately the centre line, as shown at 'A' and 'B'. In order to accommodate possibly different tensions in the springs, the trays are arranged so that they can overlap the centre line and the entire space 21 is substantially covered. The harvested berries run down inclined side screens 22 of the harvester into the trays 5, any gap being closed by a sealing device in the form of a nylon brush 23 which extends the harvesting length of the harvester.

When the harvester approaches a vine or another obstruction such as a concrete post 24, the trays move only as far as that obstruction, as shown at 'C' and 'D' because in effect the conveyors are stationary with respect to the obstruction as well as with respect to the ground. The trays 5 are held lightly against the obstruction by the springs 10 so that any gap is minimised.

The second embodiment of conveyor and its operation will now be described with respect to FIGS. 8 to 18 in the drawings. There are two conveyors 26 one on either side of the longitudinal axis of the harvester. As both are identical, only one will be described in detail. Each conveyor 26 comprises a pair of endless chains 27 which extend the length of the conveyor in a crop catching/conveying reach 28, passes around sprockets 29,30 (the upper one 30 of which is driven) at each end of the harvester and has a return run 131 which is either a lower reach or run (FIGS. 8, 13 to 15) or an upper reach or run (FIG. 16) of the conveyor.

Figure 13:
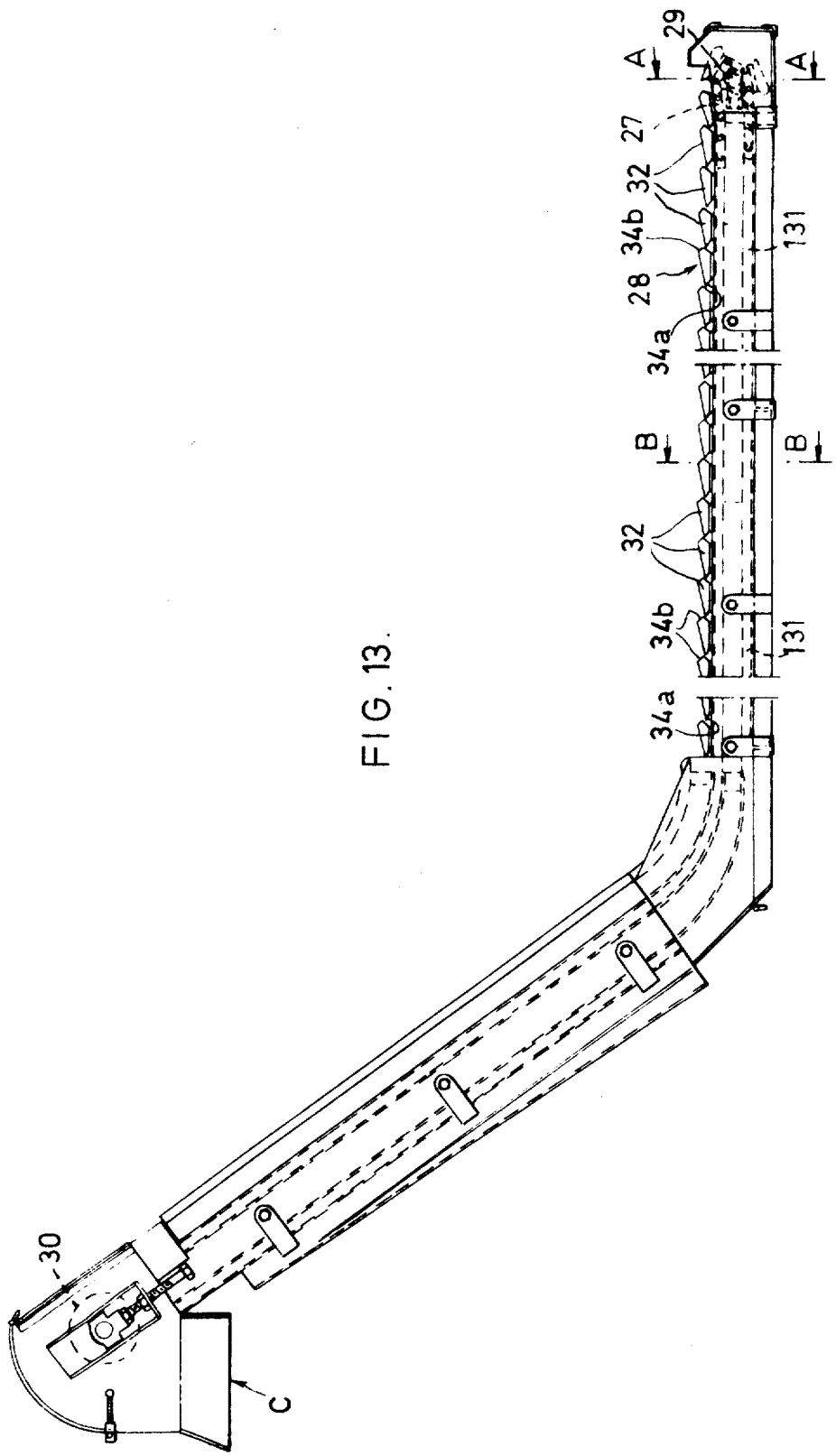
FIG. 13 shows a side elevational view of a second embodiment of conveyor in position on a harvester.
Figure 14:
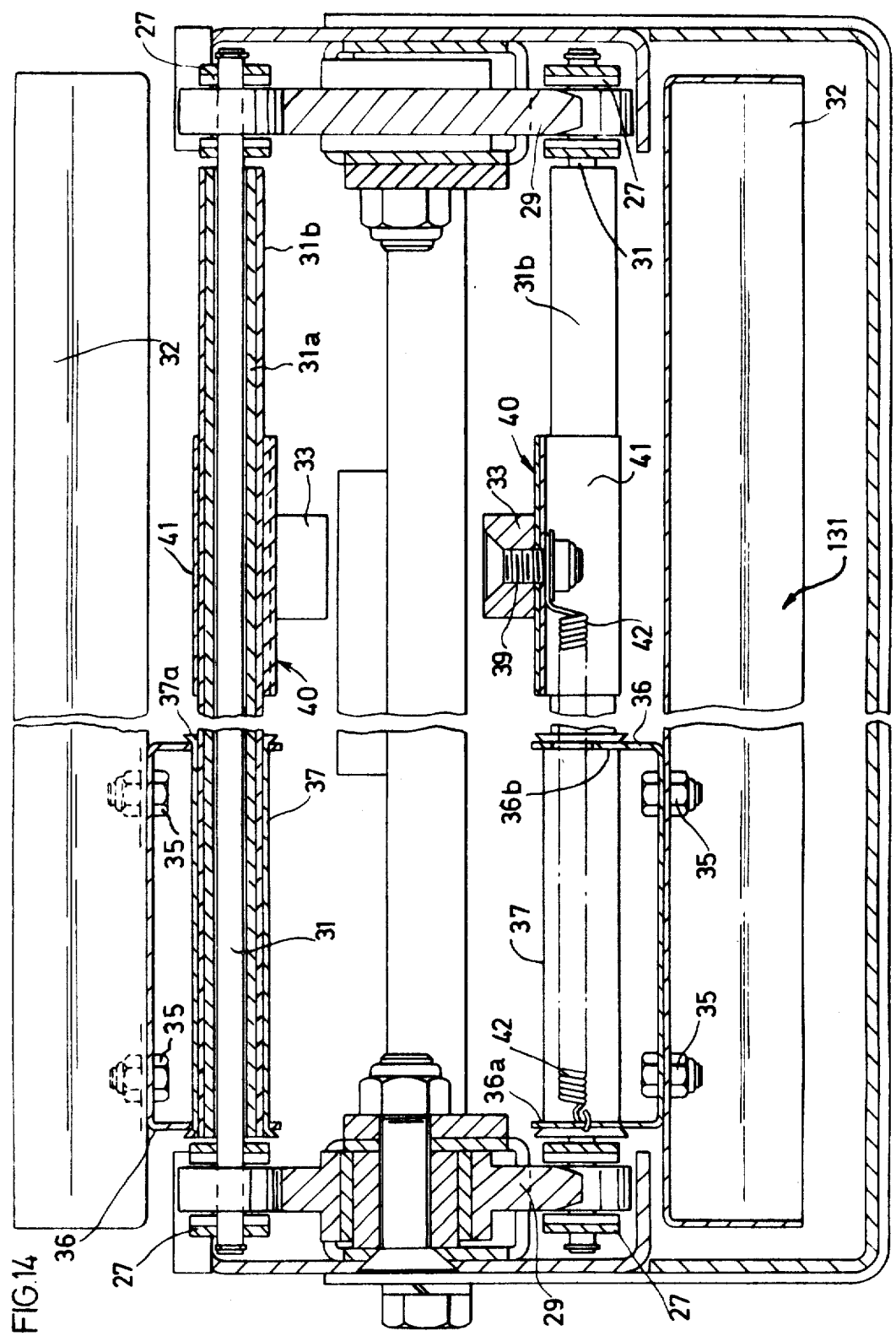
FIG. 14 shows a transverse cross-section on line A—A of FIG. 13.
Figure 15:
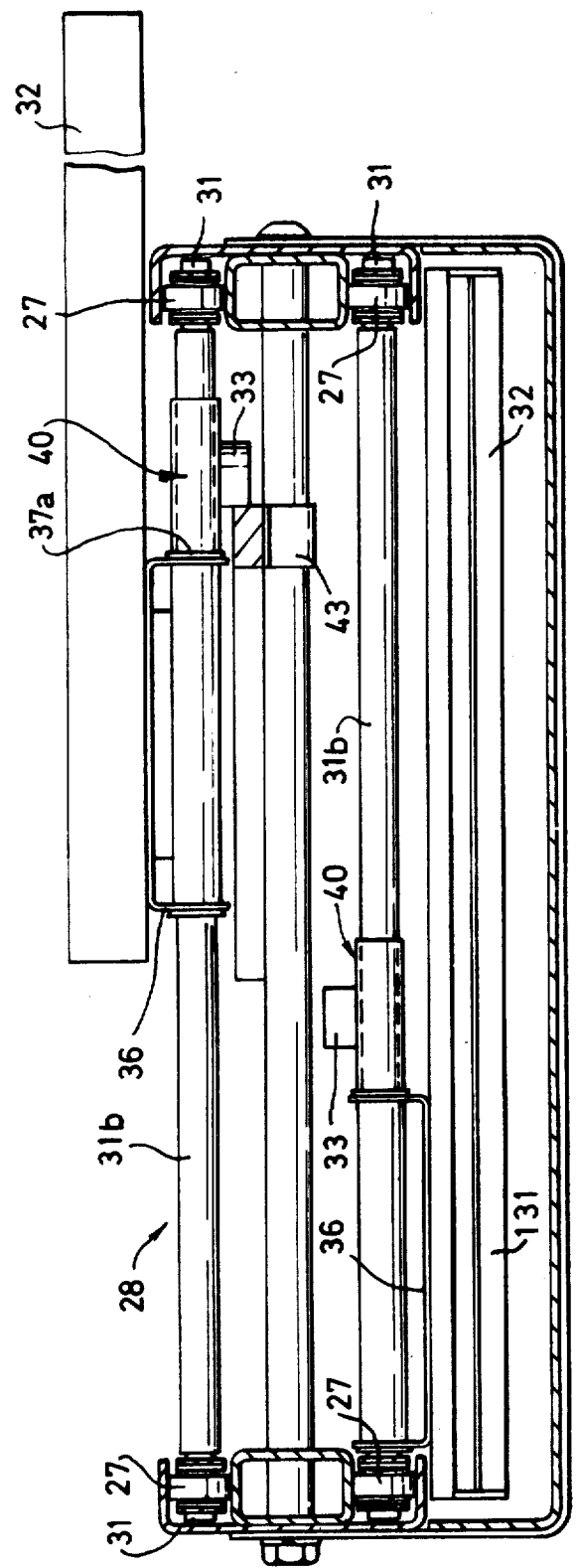
FIG. 15 shows a transverse cross-section on line B—B of FIG. 13.

In the form shown in FIGS. 13 and 14, a discharge chute C is provided which delivers the crop and juice to collectors (not shown) when the trays are inverted as their chains pass around sprockets 30 at the ends of the crop catching reaches 28.

In each case, the crop catching/conveying reach 28 moves in a direction opposite to the direction of movement of the harvester over the ground. The driven sprockets 30 are driven by a hydraulic motor 30a powered by the prime mover 49. The speed the sprockets 30 and hence of the conveyors 26 is in use virtually instantaneously controlled by a speed sensing control unit to be equal and opposite to the ground speed of the harvester so that the effective ground speed of the conveyors is zero.

The chains 27 support a plurality of guides in the form of transverse rods 31. The rods 31 are of metal covered at 31a (FIG. 14) with a low friction bearing surface 31b such as a nylon coating and are arranged in pairs. Each pair of rods 31 supports an elongate member comprising a trough or tray 32 and a cam follower 33.

Successive trays 32 overlap in the direction of the working run (by ¼" in the embodiment shown) to provide a substantially continuous conveying and catching surface.

Figures 18, 19:
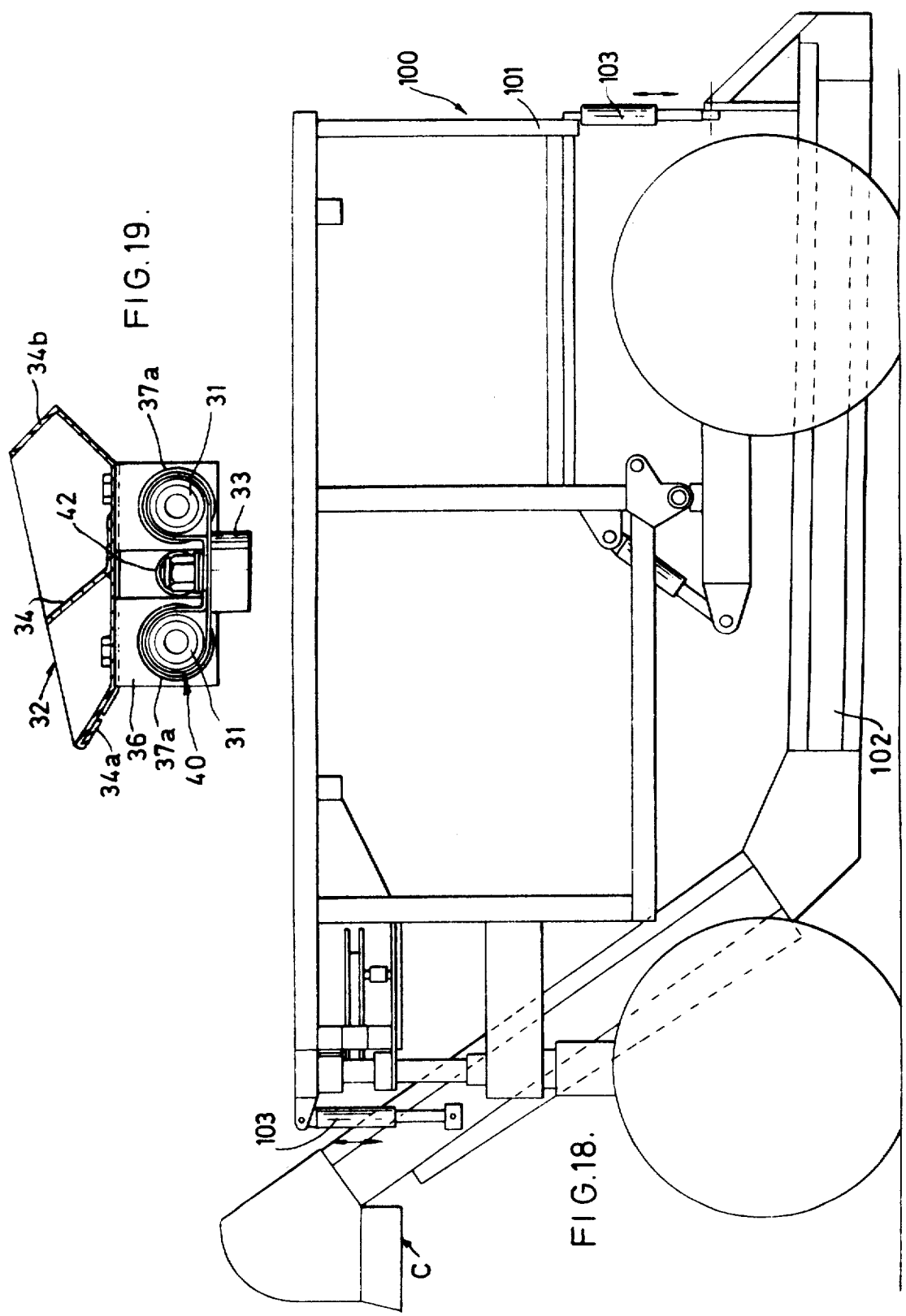
FIG. 18 shows a schematic side elevational view of harvester in which the height of the conveyors can be adjusted.
FIG. 19 shows a transverse sectional view of a catcher trough or tray forming a conveying element of the conveyor.

Each tray as shown in FIG. 19 has an optimum shape for holding a maximum of harvested crop and to this end has an open mouth leading to two compartments which extend across the length of the tray and are defined by an interior partition wall 34 which extends parallel to the side boundary walls 34a and 34b of the tray.

The cam follower 33 and the trays 32 are movable on the rods 31 in a direction laterally of the crop catching-/conveying reach of the conveyor. Each tray 32 is secured as by bolts 35 to a carrier 36 which includes two tubes 37 through which the nylon coating 31b of the rods 31 pass. The cam follower 33 is likewise supported as by a bolt 39 on a carrier 40 in the form of two tubes 41. The bolt 39 also forms an anchorage for one end of a tension spring 42 (FIG. 14), the opposite end of which is secured in the carrier 36 for the tray, as by having its hooked end engaged through holes in the outer wall 36a of that carrier 36 and passing through an aperture in the inner wall 36b of the carrier.

Figures 9, 10:
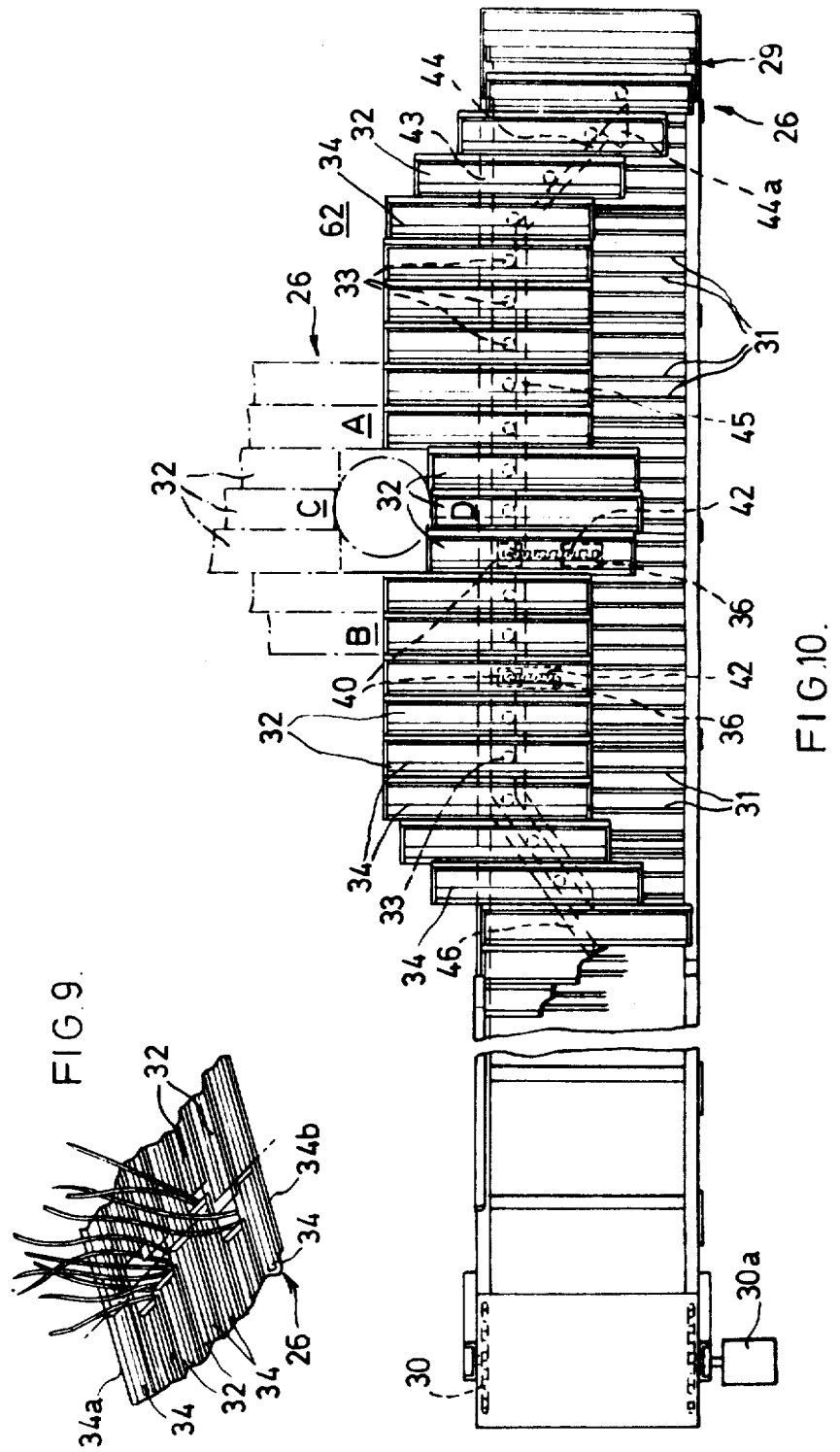
FIG. 9 shows a detail of the operation of the second embodiment of conveyor on the harvester.
FIG. 10 shows a plan view of a crop catching/conveyor run of one of the conveyors.

The harvester also has two cams 43, one for each conveyor and one of which is shown in FIG. 10. Each cam 43 has an inclined lead-in portion 44 at the front end of the harvester, a straight portion 45 and an inclined lead-out portion 46 at the trailing end of the harvester.

The lead-in portion 44 of each cam 43 has an angle of 45° and the lead-out portion 46 has an angle of 37½°. The shallower angle of the lead-out portion 46 provides a relatively slow withdrawal motion of the (full) trays so that harvested fruit in the trays is not lost by a too rapid change of direction which could lead to jolting, with subsequent loss of fruit.

Figure 16:
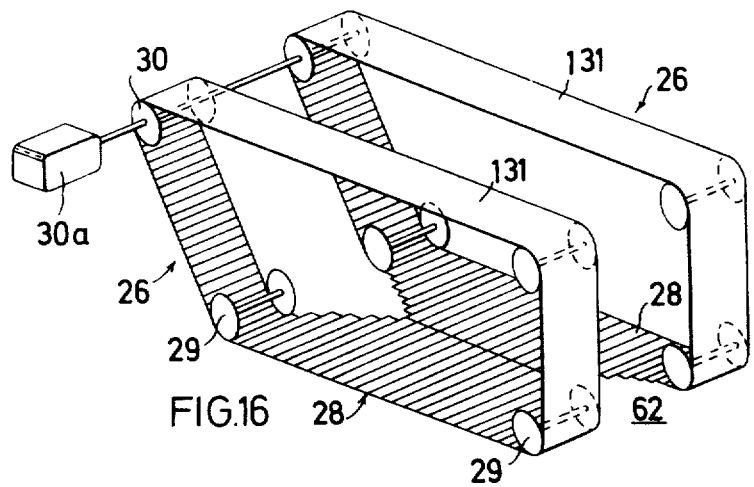
FIG. 16 shows a schematic perspective view of another arrangement of the second embodiment of conveyor, with details of the harvester itself omitted.
Figure 17:
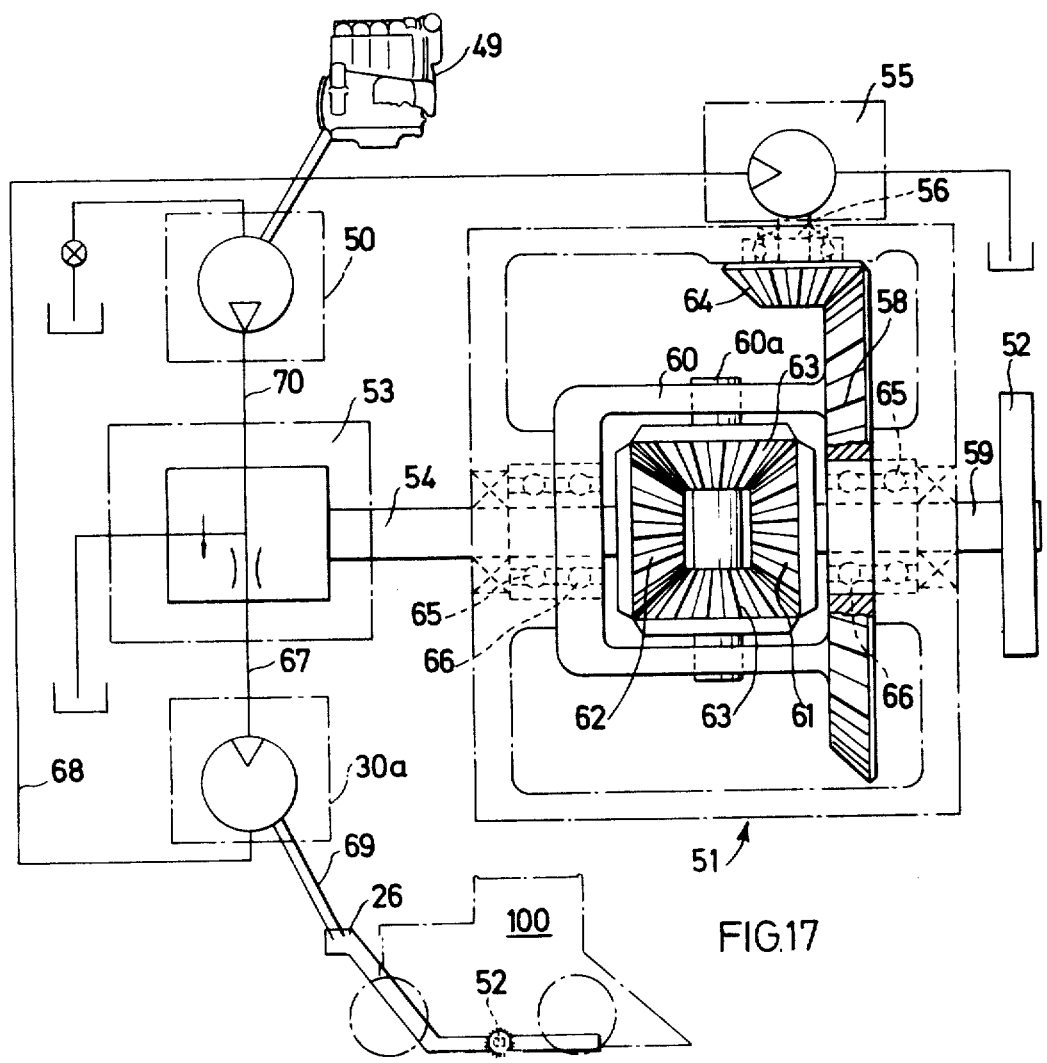
FIG. 17 shows a third angle projection of a speed matching device for maintaining the speed of the first or second embodiment of conveyor zero with respect to the ground over which the harvester traverses.

Use of the conveyor 26 will be described with reference to the conveyor having a lower return run though it will be understood that the upper return run conveyor of FIG. 16 operates in a similar way.

Using the conveyors for harvesting grapes or blackcurrants for example, the harvester is driven along a row of plants so that it straddles the row. The conveyors 26 move in the opposite direction relative to the harvester. As a result the effective speed at a plant is zero so that the harvested fruit drops into a seemingly stationary series of trays 32 which are the conveyor elements. This is accomplished by synchronising the speed of the conveyor relative to the ground speed of the harvester, by a speed sensing control unit 51 arranged so that slippage of the drive system of the conveyor or of the ground wheels does not affect the synchronisation.

Figure 8:
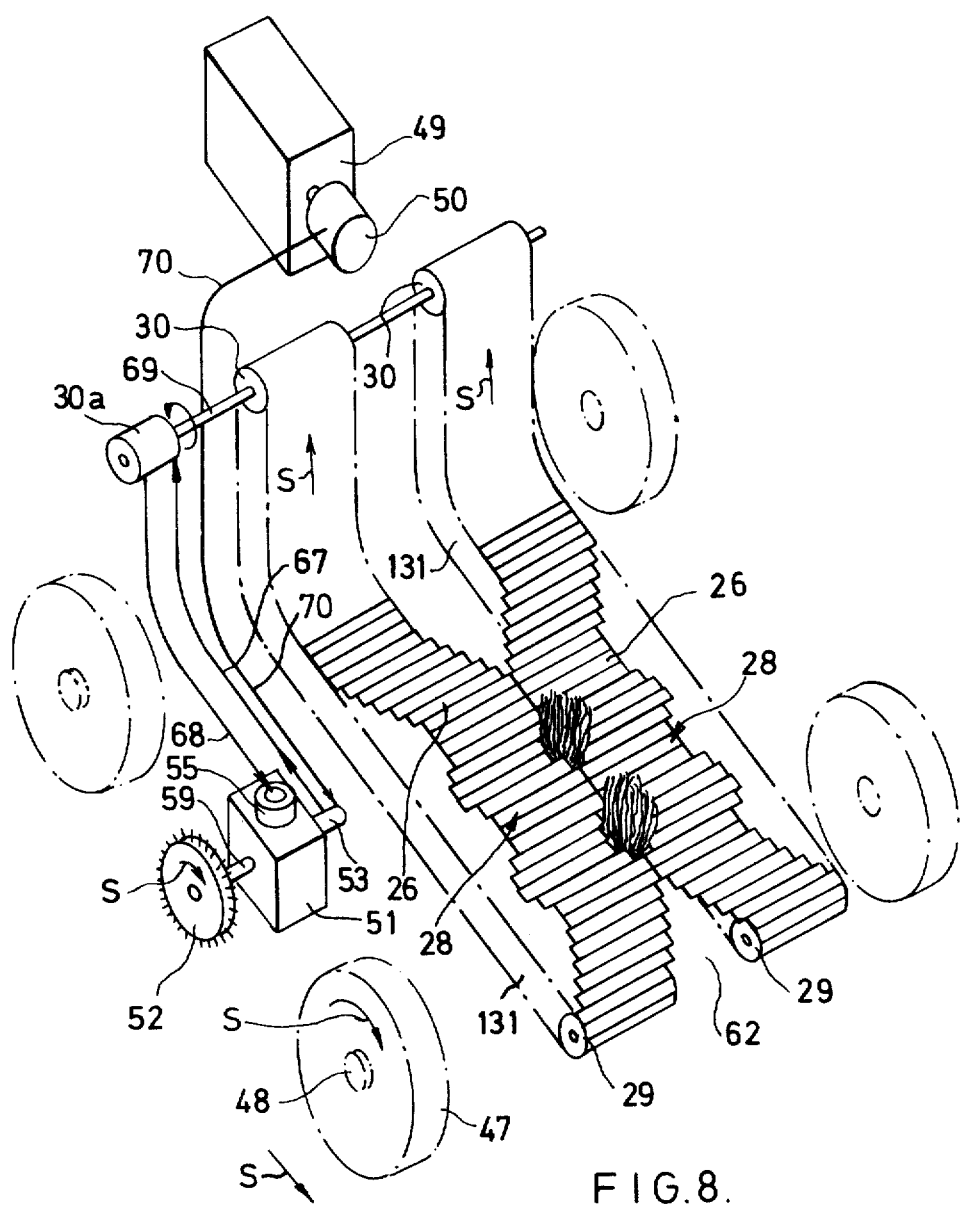
FIG. 8 is a schematic perspective view from above and in front of a harvester for tree, bush or vine grown crops with parts such as main and sub-frames and shaker devices removed for clarity but showing a second embodiment of conveyor, of which there are two extending longitudinally of the harvester.

As seen in the highly schematic diagram of FIG. 8, the straddle harvester has at least one driving ground wheel 47 having an actuator 48 driven by the prime mover 49, as is well known in the art and is described in the specification of United Kingdom Patent specification No. 1 390 495. The prime mover 49 also drives a hydraulic pump 50 that provides fluid under pressure for driving the hydraulic motor 30a for the catcher conveyor 26 which also has the speed sensing control or synchronism unit 51 for providing relative zero velocity of the conveying reach of the conveyor 26 and ground. This unit is shown in FIG. 8 and in more detail in FIG. 17 and essentially comprises a comparator device in the form of a three shaft differential gear box 51, a hydraulic pressure compensated flow control valve 53 coupled to one of the shafts (an output shaft) 54 of the differential gear box 53, the fixed displacement hydraulic motor 30a to drive one of the objects to be matched in speed, in this case the conveyor 26 (shown schematically on a schematic harvester 100 in FIG. 17), a fixed displacement hydraulic motor 55 coupled to one of the shafts 56 (the follow-up input one of this embodiment) of the differential gear box 51, and the hydraulic pump 50 for supplying fluid under pressure to the hydraulic flow control valve 53. The differential gear box 51 comprises a spider gear 58 mounting a spider 60 of channel or box shape (FIG. 17) and rotates in bearings 65. A shaft 59 mounts an input side control gear 61 and the output shaft 54 mounts an output side control gear 62 opposed to the gear 61. The spider 60 supports a fixed shaft 60a which supports opposed idler gears 63 which mesh with the input and output control gears 61 and 62.

The shaft 56 mounts a spider pinion gear 64 in mesh with the spider gear 58. The shafts 54 and 59 are free to rotate independently of the spider gear 58 and spider 60 in bearings 66. The differential gear box 51 is encased in an oil tight case.

In operation, the unit has essentially three modes, viz. starting, steady state and speed change. In operation, and during the starting mode, the input shaft 59 is rotated by an unloaded ground wheel 52, rotation of which represents the true ground speed of the harvester. The control side gear 61 is therefore rotated and this rotation is transmitted via idler gears 63 to rotate the output side control gear 62. This gear 62 rotates the output shaft 54 coupled to the flow control valve 53. Rotation of the shaft 54 opens the flow control valve 53 and hydraulic oil under pressure from the pump 50 is metered to the hydraulic motor 30a, coupled to the conveyor 26, via line 67. Because hydraulic motors 30a and 55 are piped in series via line 68, when motor 30a rotates, motor 55 will rotate instantaneously with it at the same speed or a ratio depending on the displacement of the two motors. Rotation of motor 55 rotates the input shaft 56 and spider pinion 64 which in turn rotates the spider gear 58 and the spider 60 together with the shaft 60a and the idler gears 63. When the idler gears 63 and input side control gear 61 rotate at the same speed, output side control gear 62 remains stationary, therefore the hydraulic flow control valve 53 will remain in the initial, set, position. The unit is now operating in the steady state mode.

Should the speed of input shaft 59 measuring true ground speeds of the harvester, vary for some reason, for example either because of slippage of a wheel 47 of the harvester or because of increase or decrease of the speed of the harvester 100 by the driver, in relation to the speed of the motor 55 output side control gear 62 will either rotate clockwise or anti-clockwise and speed up or slow down motors 30a and 55 instantaneously because the flow control valve 53 responds instantly to rotation of the shaft 54. As this change is instantaneous, the input shaft 59 and motor 55 remain constantly matched in speed (or at a consistent desired ratio dependent on the motor displacement and the internal gearing between the control side gear 61, idler gears 63 and spider pinion 64). In this way, the unit provides a constant instantaneous speed matching between two objects. Stated in another way any difference between the two signals represented by the speeds of the 59 and 54 introduced into the comparator device 51 offsets the synchronising control valve 53, and the difference appears as an error or difference signal in the line 67 to the hydraulic catcher conveyor motor 30a that determines the linear speed of the catcher conveyors 26. There is a coupling 69 from the motor 30a to the conveyor drive shaft. Whenever an error or difference signal output 54 from the comparator device 51 is present it corrects the speed of the drive motor 30a for the catcher conveyors 26, and the signal input represented by the shaft 59 simultaneously brings the follow-up motor 55 to the aforesaid corrected speed. The linear speed of both catcher conveyors 26 is thus quickly increased or decreased (as the case may be) until the error or difference signal in line 67 to the catcher conveyor drive motor 30a becomes zero. The synchronising control valve or controller 53 will now have assumed a new fixed or steady state position, which position drives the motors 30a and 55 at a speed which represents the true harvester ground speed S. The upper or crop catching reaches of the catcher conveyors 26 will now be running rearwardly at a new linear speed S relative to the harvester frame and this new speed will equal the true ground speed S of the harvester. In other words the catching reaches of the catcher conveyors are always automatically maintained stationary relative to the ground, even though the harvester ground speed changes due to slippage of the driving ground wheels 47 or because of changes in harvester speed made by the operator.

In the preferred embodiment, the synchronising control valve 53 receives hydraulic fluid from the pump 50 by a line 70. Conventional reservoir and sump systems for the hydraulic fluid are shown schematically in FIG. 17. The synchronising valve 53 is a variable flow control valve such as a valve Model No. 2F86, manufactured by Fluid Controls Inc., of 8341 Tyler Boulevard, Mentor, Ohio 44060, U.S.A. The position of the valve 53 determines the flow rate of hydraulic fluid from the pump 50 through the series connected hydraulic motors 30a and 55.

This unit renders control of the catcher conveyors speed insensitive to the driven speed S of the harvester drive wheels 47 as well as to the speed of the drive train for these wheels. Neither of the latter two speeds necessarily represent true harvester ground speed S whenever a harvester driving ground wheel slips on the terrain, and hence neither the driving wheel nor the drive train speeds can be relied upon to consistently maintain the crop catcher reaches of the catcher conveyors at zero speed relative to the ground.

In addition to the zero ground speed feature, the conveyors 26 close the centre space 62 of the harvester (normally about 18″ in conventional straddle harvesters). This is achieved by the trays 32 being urged to the centre line of the harvester by their springs 42 as they start their conveying run 28 which is an upper reach in FIG. 8 or a lower reach in FIG. 16. This is gradually accomplished as their cam followers 33, which may be in the form of bosses, lugs or rollers suitably of nylon, travel along the inclined forward part 44 of the cam 43 which is angled to an optimum angle, which may be adjusted. The cam followers 33 are moved out to their maximum as they move along the straight portion 45. The spring 42 urges the tray carrier 36 into engagement with the carrier 40 for the cam follower 33, which carrier 40 thus acts as a stop for the trays with the spring 42 only a slight tension which assists in decreasing risk of failure of the spring. The tubes 37 of the tray carrier have flared mouths 37a into which the carrier tubes enter.

The right hand and left hand conveyor trays are arranged so that they meet at the centre line of the harvester, as shown at 'A' and 'B' in FIG. 10. The harvested berries can run down inclined side screens of the harvester into the trays, any gap being closed by a sealing device in the form of a nylon brush which extends the harvesting length of the harvester.

When the harvester approaches a plant or another obstruction such as a concrete post, the trays move only as far as that obstruction, because in effect the conveyors are stationary with respect to the obstruction owing to the zero ground speed of the conveyors relative to the ground, as previously described. The trays are held lightly against the obstruction by the springs 42 so that any gap is minimised. The springs 42 are under a greater tension in these positions than when they are in the 'A' or 'B' position. The trays 32 are retracted for the return run when the cam followers 33 engage the part 46 of the cam 43.

A part 44a (FIG. 10) of the cam 43 (at the fore end of the harvester) is removable or can be moved as by sliding to a position where it is not struck by the cam followers. The trays are thus not moved outwardly to the centre line of the harvester. This may be necessary in certain circumstances for example where the whole of the centre gap 62 is filled by large mature bushes to be harvested.

It will be understood that effective zero ground speed of the first embodiment of conveyor may be achieved using the speed sensing control unit already described. It will also be understood that the speed sensing control or synchronising unit could be used for matching the speed of any two objects other than the relative zero velocity of a harvester conveyor and the ground.

The trays 5, 32 may be made of any suitable material, for example steel, or plastics, or aluminum.

Referring now to FIG. 18, the harvester 100 shown schematically therein has a main frame 101 mounting a pair or pairs of crop catching conveyors 102. The or each conveyor 102 is mounted by means for independent vertical adjustment for different catching heights. The means for independent vertical adjustment is, in the embodiment illustrated, in the form of fore and aft hydraulic piston and cylinder units 103 connecting the conveyors to the main frame 101. Thus by adjustment of the height of a conveyor, effectively a vertical series of heights can be achieved with one conveyor.

It will be understood that the harvester described may be of the kind which has shakers which have tines which engage the bush or vine and shake it vigorously without destroying it. Such a harvester is shown and described in the specification of my British Patent No. 1 390 495 or in co-pending Application No. 20335/76.

It will also be understood that the embodiments of conveyor shown and described herein with reference to the drawings are only examples of the invention, which can be modified in several ways. For example, the conveyors may be mounted so that they can swing laterally of the fore and aft direction of the harvester so that the conveyors have a self-levelling effect on uneven terrain. Also, the rubber spring 10 or the cell spring 42 could be replaced by a pneumatic or hydraulic dash-pot, or other suitable device. Also, the trays may be so mounted on means which allows their inboard ends to tilt downwardly when they have moved transversely so that fruit from low branches can be caught, e.g. at substantially ground level.

In every embodiment, the conveyors cover substantially the entire central gap of the harvester so that substantially all the harvested fruit can be collected and may also catch any juice expelled from the fruit during harvesting.

We claim:

1. In a harvesting machine for harvesting crops growing on plants such as trees, bushes, canes, vines or the like, having stalks growing from the ground, said harvester having frame means, means for advancing the harvester in a direction along a row of said stalks, means on said frame means for dislodging crop from the plants, endless conveyor means on said frame means having laterally spaced endless flexible side conveyors which straddle the crop along a crop receiving reach, means for driving said conveyors for moving said reach in a conveying direction opposite to the advance direction of said harvester and at zero speed relative to the ground, a row of individual crop catching and conveying trays mounted on each of said side conveyors, means for resiliently urging said trays laterally of the conveying direction of the conveying reach of the conveyor means toward the row of stalks, cam means for retracting the trays at the front of the harvester for initially clearing stalks and for releasing the trays for resiliently engaging and surrounding the stalks as the harvester advances; the improvement wherein said side conveyors, each having laterally spaced flexible inside and outside members, longitudinally spaced rods interconnecting the flexible members of each side conveyor, means for mounting said trays on said rods for laterally slidable non-rotating motion with said trays disposed in a longitudinal row at each side of the longitudinal axis of said harvester, said trays each having smooth side edges that are substantially contiguous to the side edges of adjacent trays for forming a continuous crop catching and conveying surface, said resilient means urging said trays to slide laterally inwardly along said rods to bring the inner ends of the trays of one row into substantially end to end relation with the trays of the other row at substantially the longitudinal axis of the harvester, said resilient means accommodating termination of the sliding action of said trays when their inner ends encounter the lateral sides of the stalks of the crop as the harvester advances, said resilient means causing the trays on the front and rear sides of a stalk to be brought into substantially end to end relation for forming a continuous crop catching reach around the stalk.

2. The harvester of claim 1, wherein said harvester frame means comprises main frame, a sub-frame for mounting both side conveyors, and means for adjustably mounting said sub-frame for vertical motion relative to said main frame while maintaining the sub-frame substantially parallel to the ground; the improvement wherein said sub-frame mounting means comprises hydraulic cylinder means connected between front and rear end portions of said sub-frame and said main frame.

3. In a harvester for rows of bush or vine grown crops having stalks, such as a crop of currants, berries, grapes, etc., said harvester comprising a carriage having frame means for straddling the crop, drive wheels, power means for driving the wheels, means for dislodging the crop, longitudinally running crop catcher conveying means comprising a pair of conveyors for progression along opposite sides of a row, said conveyors each comprising a longitudinal array of laterally displaceable crop catching elements, said conveyors each having a crop catching reach and a return reach, and means for driving said conveyors at a linear speed relative to the harvester carriage which maintains their crop catching reaches stationary relative to the ground; the improvement wherein said conveyor driving means comprises a hydraulic pump driven by said power means, flow control valve means for receiving fluid from said pump, variable speed hydraulic motor means for receiving fluid from said valve means for driving said conveyors, ground speed sensor means comprising a freely rotatable land wheel supported on said carriage, differential gear comparator means having a rotatable control input from said land wheel, said differential gear comparator means also having a rotatable follow-up input driven at a speed proportional to that of said conveyor drive motor means, said comparator means also having rotatable output means for operating said valve means, said output means being stationary when said conveyor drive motor means drives the crop catching reach of said conveyor means at zero ground speed, said output means rotating for providing an error signal to said valve means when the rate of rotation of said conveyor motor drive means follow-up input differs from the rate of rotation of said land wheel control input, means rendering said valve means responsive to said error signal for simultaneously correcting the speed of said conveyor driving motor means and that of said follow-up input to said comparator means until the error signal from said comparator means becomes zero, whereupon the crop catching reaches of said conveyors are automatically held stationary relative to the ground.

4. The harvester of claim 3, wherein said error correcting means comprises a hydraulic motor connected in series with said conveyor drive motor means.

* * * * *